(12) United States Patent
Wilson et al.

(10) Patent No.: US 10,853,210 B2
(45) Date of Patent: Dec. 1, 2020

(54) STORAGE DEVICE HEALTH STATUS SYNCHRONIZATION

(71) Applicant: NetApp Inc., Sunnyvale, CA (US)

(72) Inventors: Daniel Curtis Wilson, Cary, NC (US); Deepan Natesan Seeralan, Morrisville, NC (US); Kyle Diggs Sterling, San Francisco, CA (US); Linda Ann Riedle, Cary, NC (US); Loellyn Jane Cassell, Pleasanton, CA (US); Mayank Saxena, Fremont, CA (US); Sandeep T. Nirmale, Santa Clara, CA (US)

(73) Assignee: NetApp Inc., Sunnyvale, CA (US)

( * ) Notice: Subject to any disclaimer, the term of this patent is extended or adjusted under 35 U.S.C. 154(b) by 39 days.

(21) Appl. No.: 16/353,049

(22) Filed: Mar. 14, 2019

(65) Prior Publication Data

US 2019/0205228 A1    Jul. 4, 2019

Related U.S. Application Data

(63) Continuation of application No. 15/162,536, filed on May 23, 2016, now Pat. No. 10,289,506, which is a continuation of application No. 14/220,768, filed on Mar. 20, 2014, now Pat. No. 9,348,715.

(51) Int. Cl.
*G06F 11/20* (2006.01)
*G06F 11/16* (2006.01)
*G06F 11/30* (2006.01)

(52) U.S. Cl.
CPC ...... *G06F 11/2092* (2013.01); *G06F 11/1658* (2013.01); *G06F 11/3006* (2013.01); *G06F 11/3055* (2013.01)

(58) Field of Classification Search
CPC .................. G06F 11/1658; G06F 11/2092
See application file for complete search history.

(56) References Cited

U.S. PATENT DOCUMENTS

| 5,504,861 | A * | 4/1996 | Crockett | G06F 11/1435 |
| | | | | 714/13 |
| 6,119,244 | A | 9/2000 | Schoenthal et al. | |
| 6,199,074 | B1 | 3/2001 | Kern et al. | |
| 6,629,264 | B1 | 9/2003 | Sicola et al. | |
| 6,928,513 | B2 * | 8/2005 | Lubbers | G06F 11/2064 |
| | | | | 711/114 |

(Continued)

*Primary Examiner* — Joseph R Kudirka
(74) *Attorney, Agent, or Firm* — Cooper Legal Group, LLC

(57) ABSTRACT

One or more techniques and/or systems are provided for storage device health status synchronization. For example, a first health status registry is maintained for a first storage controller at a first storage site. The first storage controller stores storage device health status information of storage devices currently owned by or assigned to the first storage controller within the first health status registry. A second health status registry is maintained for a second storage controller at a second storage site. The second storage controller stores storage device health status information of storage device currently owned by or assigned to the second storage controller within the second health status registry. The first health status registry and the second health status registry are synchronized during operation of the first storage site and the second storage site and/or are merged between the first storage site and the second storage site after disaster recovery.

20 Claims, 10 Drawing Sheets

(56) References Cited

U.S. PATENT DOCUMENTS

| | | | |
|---|---|---|---|
| 7,457,830 B1* | 11/2008 | Coulter | G06F 11/1471 |
| 7,793,148 B2 | 9/2010 | Beardsley et al. | |
| 7,831,550 B1* | 11/2010 | Pande | G06F 16/27 |
| | | | 707/610 |
| 7,908,446 B2 | 3/2011 | Kimura et al. | |
| 8,321,374 B2* | 11/2012 | Holt | G06F 16/273 |
| | | | 707/610 |
| 2010/0058005 A1 | 3/2010 | Matumura et al. | |
| 2010/0162036 A1 | 6/2010 | Linden et al. | |
| 2011/0196825 A1* | 8/2011 | Suzuki | G06F 11/2082 |
| | | | 707/613 |
| 2011/0213781 A1* | 9/2011 | Hansel | G06F 16/273 |
| | | | 707/741 |

\* cited by examiner

STORAGE DEVICE HEALTH STATUS SYNCHRONIZATION

RELATED APPLICATION

This application claims priority to and is a continuation of U.S. patent application Ser. No. 15/162,536, filed on May 23, 2016 and titled "STORAGE DEVICE HEALTH STATUS SYNCHRONIZATION," which claims priority to and is a continuation of U.S. Pat. No. 9,348,715, filed on Mar. 20, 2014 and titled "STORAGE DEVICE HEALTH STATUS SYNCHRONIZATION," which are incorporated herein by reference.

BACKGROUND

A network storage environment may comprise one or more storage controllers configured to provide client devices with access to data stored on storage devices accessible from the respective storage controllers.

DETAILED DESCRIPTION

Figure 1:
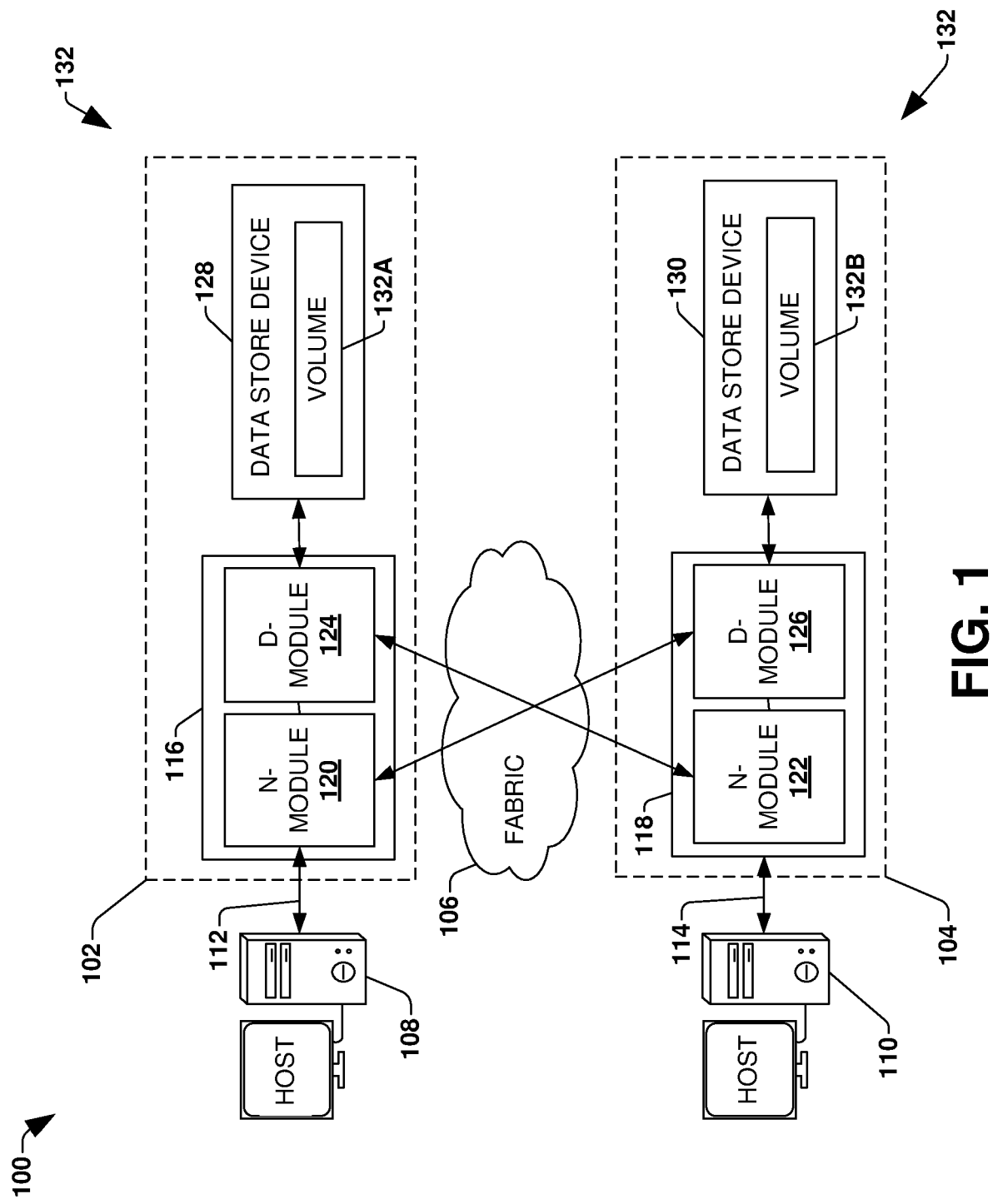
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for storage device health status synchronization are provided. Within a network storage environment, a first storage controller is located at a first storage site (e.g., a first location such as a first city) and a second storage controller is located at a second storage site (e.g., a second location such as a second city). The first storage controller may manage a first storage aggregate (e.g., a logical grouping of storage devices that may be assigned to or owned by the first storage controller) comprising a first storage device located at the first storage site and a second storage device located at the second storage site. The second storage controller may similarly manage a second storage aggregate (e.g., a logical grouping of storage devices that may be assigned to or owned by the second storage controller). Data may be mirrored between storage devices within a storage aggregate, such as from the first storage device to the second storage device and vice versa to allow for switchover operations.

A storage controller that owns a storage device, or to which the storage device is assigned, may be configured to monitor health of the storage device (e.g., a single storage controller may own a storage device at any given time, and ownership of the storage device may be switched between storage controllers such as to provide switchover operation during disaster recovery). The storage controller may store health status information within a health status registry. The health status registry may be synchronized and/or merged with health status registries of other storage controllers. In this way, if the storage controller fails and a second storage controller takes ownership of the storage device, then the second storage controller has up-to-date health status information about the storage device. Similarly, when the storage controller is restored, the second storage controller may provide up-to-date health status information to the restored storage controller.

To provide context for health status synchronization, FIG. 1 illustrates an embodiment of a clustered network environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration (e.g., utilizing information replicated between replication databases at the first storage site and the second storage site) where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the N-module 120 in the node 116 within data storage system 102. The node 116 can forward the data to the data storage device 128 using the D-module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that storage device health status synchronization may be implemented within the clustered network environment 100. For example, a registry synchronization component and/or a registry merger component may be implemented between the first data storage system or storage site 102 and the second data storage system or storage site 104. The registry synchronization component and/or the registry merger component may be configured to synchronize storage device health status data between a first health status registry for the first data storage system or storage site 102 and a second health status registry for the second data storage system or storage site 104. The storage device health status data may comprise health status information for the data storage device 128 and/or the data storage device 130.

Figure 2:
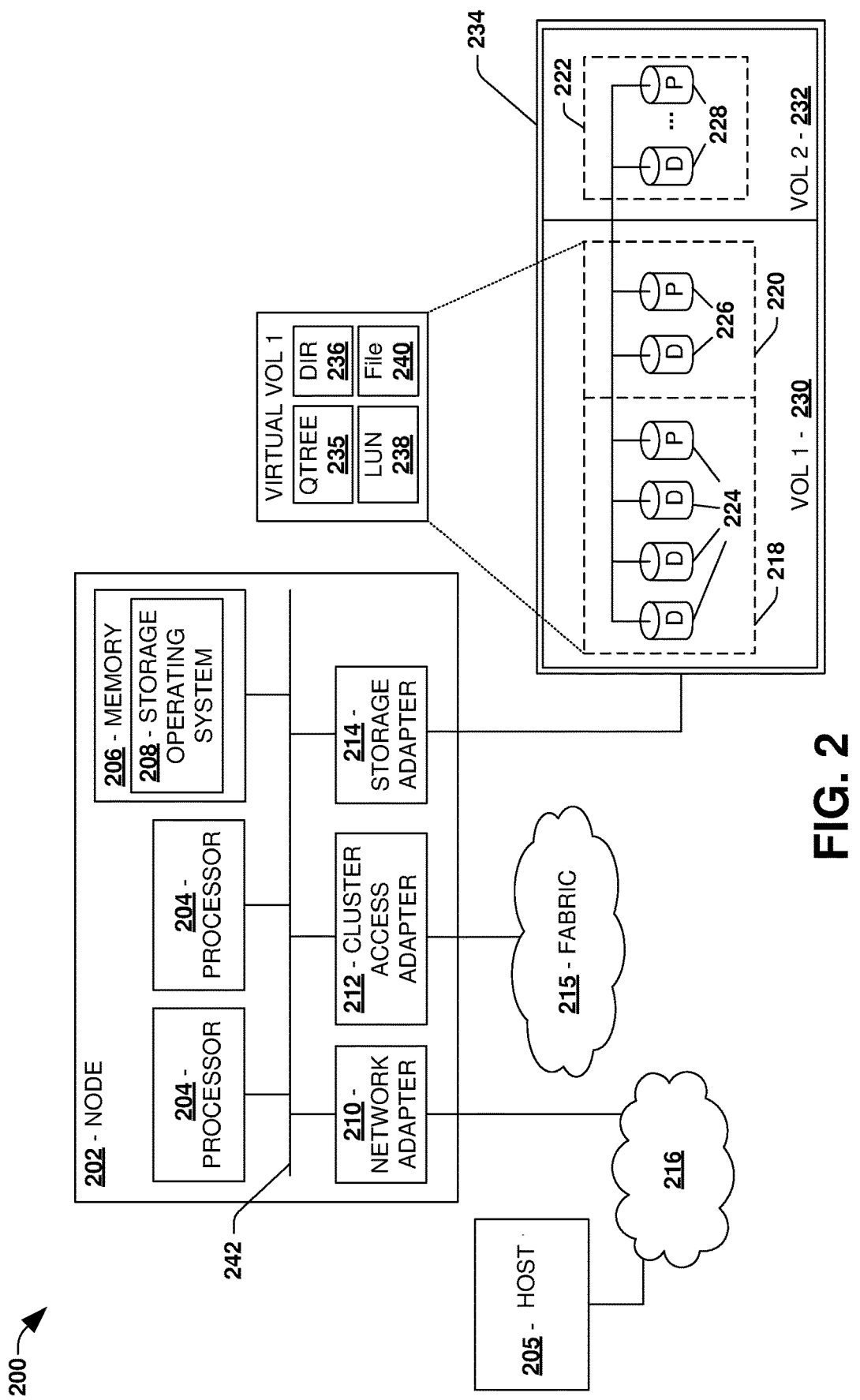
FIG. 2 is a component block diagram illustrating an example data storage system in accordance with one or more of the provisions set forth herein.

FIG. 2 is an illustrative example of a data storage system or storage site 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that storage device health status synchronization may be implemented for the data storage system or storage site 200. For example, a registry synchronization component and/or a registry merger component may be implemented between the data storage system or storage site 200 and a second data storage system or storage site not illustrated. The registry synchronization component and/or the registry merger component may be configured to synchronize storage device health status data between a first health status registry for the data storage system or storage site 200 and a second health status registry for the second data storage system or storage site. The storage device health status data may comprise health status information for the data storage devices 234.

Figure 3:
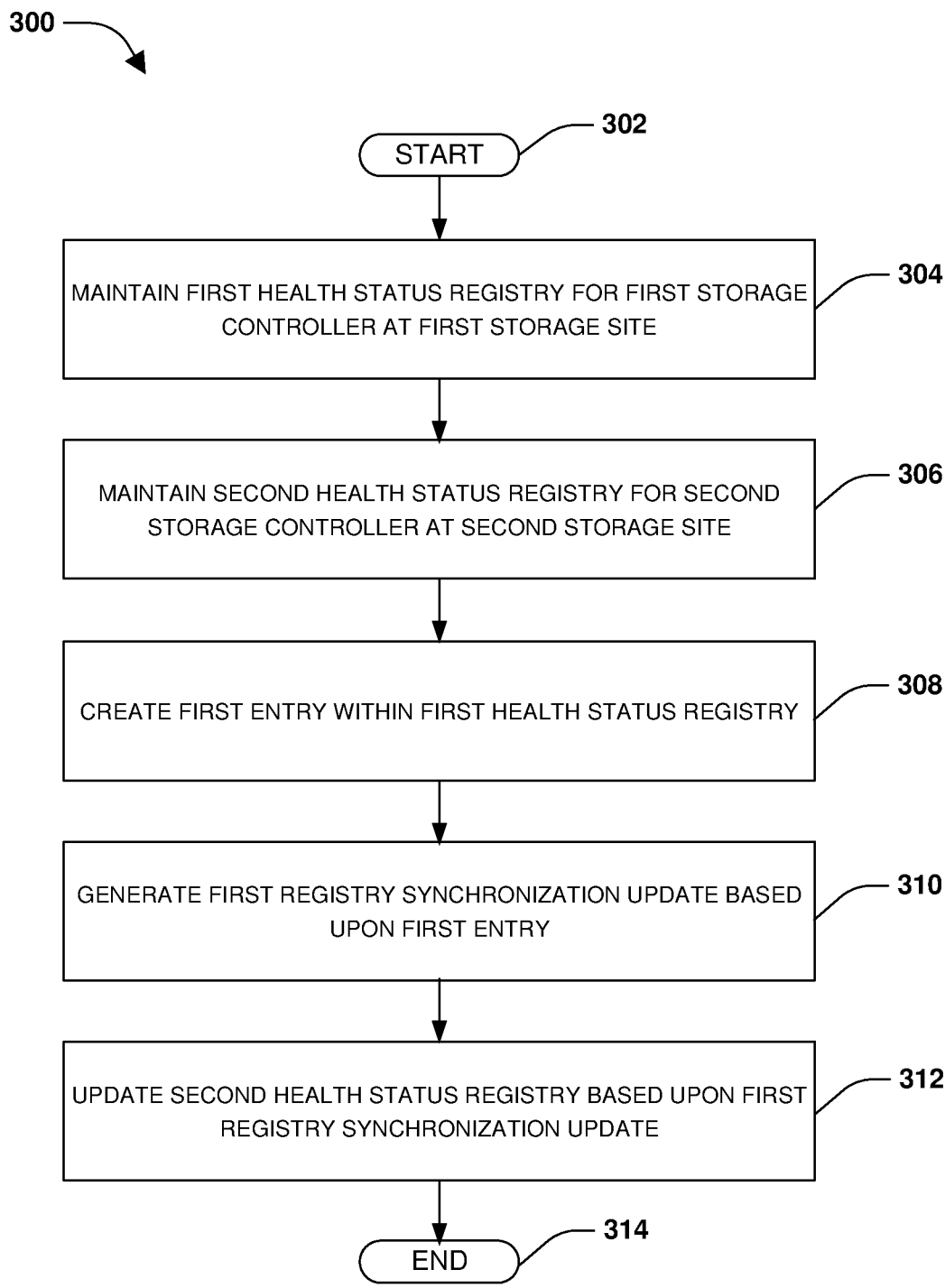
FIG. 3 is a flow chart illustrating an exemplary method of storage device health status synchronization.

One embodiment of storage device health status synchronization is illustrated by an exemplary method 300 of FIG. 3. At 302, the method starts. At 304, a first health status registry may be maintained for a first storage controller at a first storage site. The first storage site may comprise a first storage device and/or other storage devices assigned to a first storage aggregate maintained by the first storage controller. At 306, a second health status registry may be maintained for a second storage controller at a second storage site. The second storage site may comprise a second storage device and/or other storage devices assigned to the first storage aggregate maintained by the first storage controller (e.g., the second storage device may be configured according to a mirror configuration for the first storage device such that data of the first storage device is mirrored to the second storage device so that the second storage controller may use the second storage device for switchover operation in the event the first storage controller fails).

A first health status change associated with the first storage device may be identified. In an example, the first storage controller may determine that the first storage device has a degraded health status based upon an I/O timeout or an I/O latency that exceeds a latency threshold. In another example, a restored health status may be identified based upon a notification (e.g., from an administrator) that the first storage device has recovered from the degraded health status. In this way, a wide variety of health status information may be identified based upon various information regarding the operation of the first storage device. The first storage controller may identify the first health status change because the first storage controller may be a current owner of the first storage device (e.g., client device I/O access to the first storage device may be provided through the first storage controller, and thus the first storage controller may be capable of identifying the first health status change, such as the I/O timeout). At 308, first entry may be created within the first health status registry based upon the first health status change. In an example, a second health status change associated with the second storage device may be identified (e.g., an administrator may provide an indication that the administrator is failing the second storage device). A second entry may be created within the first health status registry based upon the second health status change. In this way, the first storage controller may store health status information, within the first health status registry, of storage devices owned by the first storage controller.

At 310, a first registry synchronization update may be generated based upon the first entry. In an example, a second synchronization registry update may be generated based upon the second entry. At 312, the second health status registry may be updated based upon the first registry synchronization update and/or other registry synchronization updates. For example, a first synchronized entry may be created within the second health status registry based upon the first registry synchronization update. The first synchronized entry may specify health status information associated with the first storage device. In an example, one or more entries, within the second health status registry, that are made inconsistent/stale based upon the first registry synchronization update may be removed from the second health status registry. In an example, a second synchronized entry may be created within the second health status registry based upon the second registry synchronization update. The second synchronized entry may specify health status information associated with the second storage device.

In an example of updating the second health status registry, a communication failure between the first storage site and the second storage site may be identified (e.g., before transmission of the first registry synchronization update to the second storage site for updating the second health status registry). A retransmission registry synchronization update may be generated. Responsive to establishing communication between the first storage site and the second storage site within a retransmission threshold (e.g., communication is reestablished within 10 seconds), a retransmission registry synchronization update may be sent to the second storage site for updating the second health status registry. In this way, the second health status registry may be updated with up-to-date health status information from the first health status registry.

In an example, the second storage controller may be configured according to a disaster recovery configuration with respect to the first storage controller. A disaster of the first storage site may be identified. Ownership of the second storage device may be assigned to the second storage controller as a switchover aggregate. The second storage controller may facilitate data access to the switchover aggregate utilizing the second storage device. For example, the second health status registry may be evaluated to (e.g., to identify an entry associated with the second storage device, such as the second synchronized entry specifying health information of the second storage device). Responsive to the second health status registry indicating that the second storage device has a functional health status (e.g., the second health status registry may lack an entry for the second storage device, thus indicating that the second storage device is healthy), data access may be provided to the second storage device by the second storage controller. Responsive to the entry indicating that the second storage device has a degraded health status, degraded data access may be provided to the second storage device by the second storage controller (e.g., the second storage controller may restrict access to the second storage device; the second storage controller may provide filtered access to the second storage device for certain types of data or I/O access, such as non-latency sensitive I/O access; the second storage controller may reduce I/O access bandwidth to the second storage device; etc.).

While the second storage controller has ownership of the second storage device (e.g., while providing switchover operation to the switchover aggregate), an updated health status change associated with the second storage device may be identified. An updated entry may be created within the second health status registry based upon the updated health status change. For example, the updated entry may specify that the second storage device has a restored health status (e.g., the administrator may unfail the second storage device). In this way, the second storage controller may monitor health status information of storage controllers currently owned by the second storage controller.

Restoration of the first storage site may be identified. In an example of storage device health status synchronization, a registry synchronization update may be generated based upon the updated entry within the second health status registry. The first health status registry may be updated based upon the registry synchronization update to create a synchronized entry within the first health status registry. For example, the synchronized entry may indicate that the second storage device has the restored health status. One or more stale/inconsistent entries, such as the second entry, may be removed from the first health status registry. Ownership of the second storage device may be assigned to the first storage controller for selective operation of the first storage device and the second storage device based upon the first health status registry. For example, access may be provided to the second storage device based upon the synchronized entry.

In an example of storage device health status synchronization, the second health status registry and the first health status registry may be merged based upon restoration of the first storage site. If a conflict or inconsistency is detected between information within the second health status registry and information within the first health status registry, then a tie-breaker technique may be used for merger. For example a first merger candidate entry within the first health status registry (e.g., the first storage controller may have created an entry specifying that a third storage device is operational) may be identified as being different than a second merger candidate entry within the second health status registry (e.g., the second storage controller may have created an entry specifying that the third storage device has failed). The tie-breaker technique may be used to selectively merge that first merge candidate entry and/or the second merge candidate entry. For example, the storage device may be evaluated using a real-time storage device evaluation technique to determine whether the storage device is healthy or not. If the real-time storage device evaluation technique indicates that the storage device is healthy, then no entry or a healthy status candidate entry is used during merger. If the real-time storage device evaluation technique indicates that the storage device is unhealthy or that the health of the storage device is indeterminate, then an unhealthy status candidate entry is retained during merger. In this way, storage device health status information may be synchronized between storage controllers. At 314, the method ends.

Figure 4A:
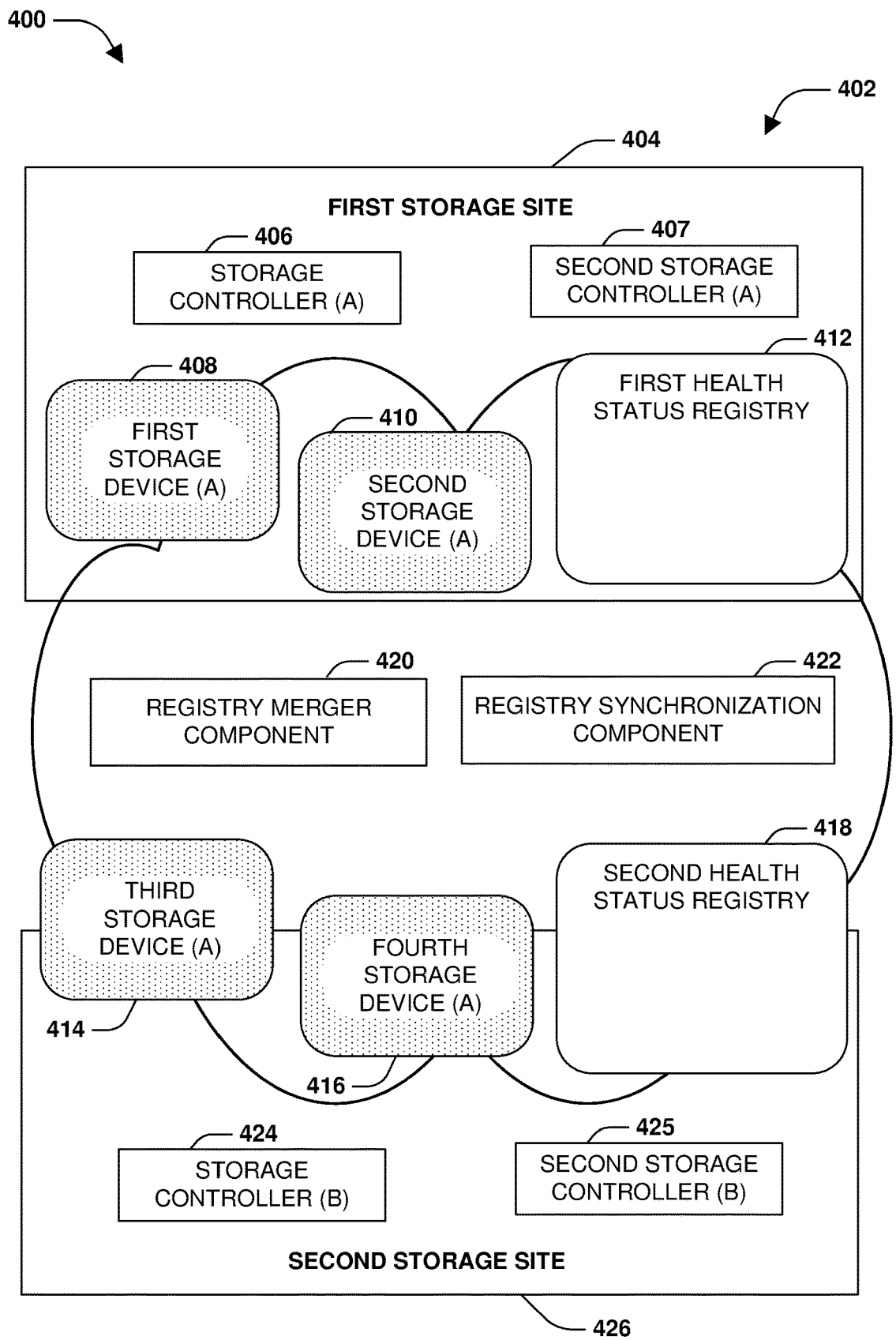
FIG. 4A is an example of a first storage site comprising a storage controller (A) configured to provide data access to a storage aggregate (A).

FIGS. 4A-4F illustrate examples of a system 402, comprising a registry merger component 420 and/or a registry synchronization component 422, for storage device health status synchronization. FIG. 4A illustrates an example 400 of a first storage site 404 comprising a storage controller (A) 406 and/or other storage controllers (e.g., a second storage controller (A) 407 configured according to a high availability configuration for the storage controller (A) 406 such that the second storage controller (A) 407 provides failover operation for the storage controller (A) 406 in the event the storage controller (A) 406 fails) configured to provide data access to a storage aggregate (A) associated with a first storage device (A) 408, a second storage device (A) 410, a third storage device (A) 414, and/or a fourth storage device (A) 416. The third storage device (A) 414 may be configured according to a data mirroring configuration for the first storage device (A) 408 (e.g., data may be mirrored from the first storage device (A) 408 to the third storage device (A) 414). The fourth storage device (A) 416 may be configured according to a data mirroring configuration for the second storage device (A) 410 (e.g., data may be mirrored from the second storage device (A) 410 to the fourth storage device (A) 416). The first storage device (A) 408 and the second storage device (A) 410 may be located at the first storage site 404, and the third storage device (A) 414 and the fourth storage device (A) 416 may be located at a second storage site 426.

The second storage site 426 may comprise a storage controller (B) 424 and/or other storage controllers (e.g., a second storage controller (B) 425 configured according to a high availability configuration for the storage controller (B) 424 such that the second storage controller (B) 425 provides failover operation for the storage controller (B) 424 in the event the storage controller (B) 424 fails) configured to provide switchover operation for the storage controller (A) 406 in the event the first storage site 404 has a disaster. For example, the storage controller (B) 424 may provide client devices with I/O access to data mirrored from the first storage device (A) 408 to the third storage device (A) 414 and/or data mirrored from the second storage device (A) 410 to the fourth storage device (A) 416.

A first health status registry 412 may be maintained for the storage controller (A) 406 at the first storage site 404. The storage controller (A) 406 may be configured to store storage device health status information, within the first health status registry 412, for storage devices currently owned by the storage controller (A) 406 such as the first storage device (A) 408, the second storage device (A) 410, the third storage device (A) 414, and the fourth storage device (A) 416. A second health status registry 418 may be maintained for the storage controller (B) 424 at the second storage site 426. The storage controller (B) 424 may be configured to store storage device health status information, within the second health status registry 418, for storage devices currently owned by the storage controller (B) 424.

Figure 4B:
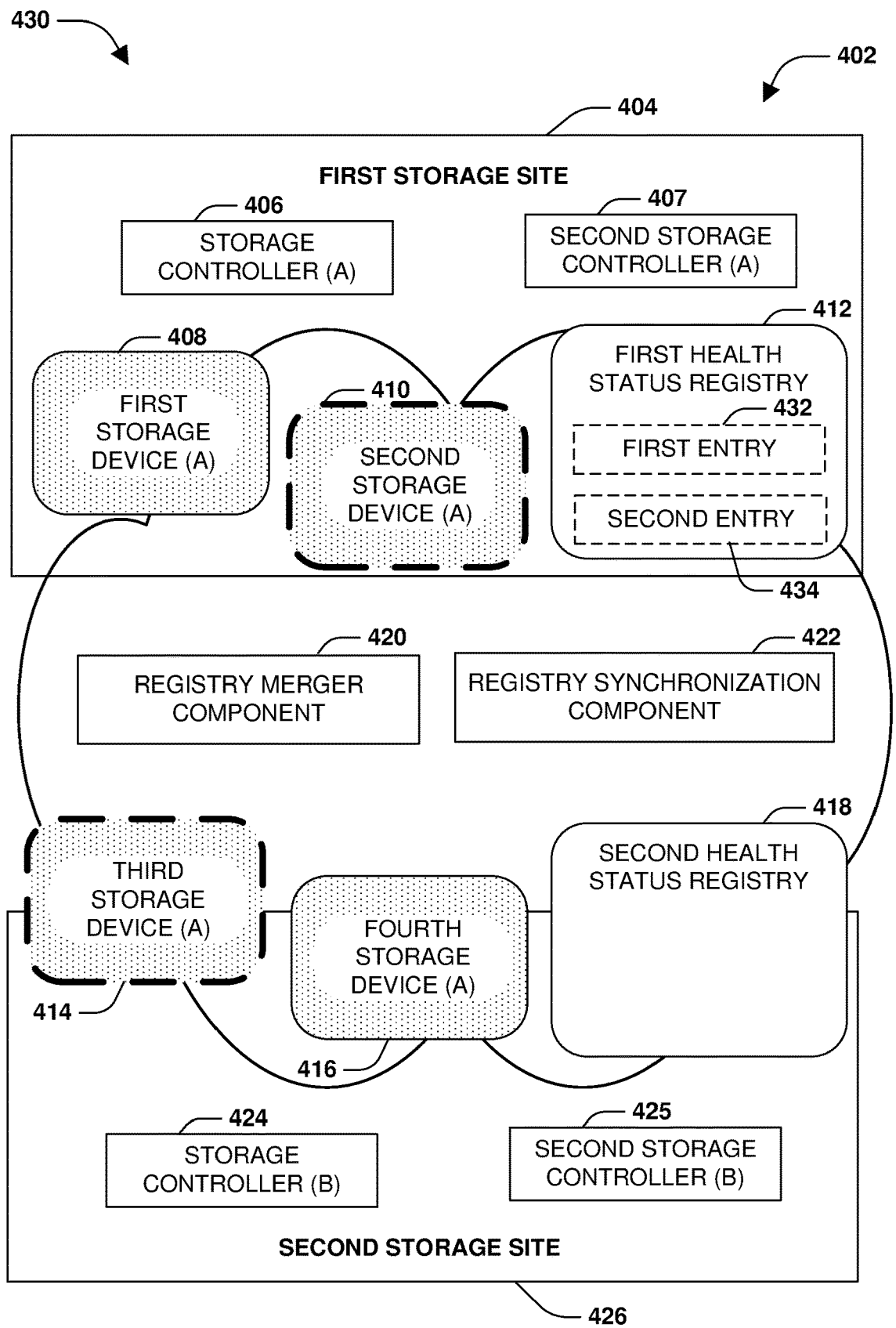
FIG. 4B is an example of a storage controller (A) storing storage device health status information within a first health status registry.

FIG. 4B illustrates an example 430 of the storage controller (A) 406 storing storage device health status information within the first health status registry 412. For example, the storage controller (A) 406 may identify a first health status change (e.g., a change from a normal operation health status to a degraded health status) associated with the second storage device (A) 410. The storage controller (A) 406 may create a first entry 432 within the first health status registry 412 based upon the first health status change. The storage controller (A) 406 may identify a second health status change (e.g., a change from a normal operation health status to a degraded health status) associated with the third storage device (A) 414. The storage controller (A) 406 may create a second entry 434 within the first health status registry 412 based upon the second health status change.

Figure 4C:
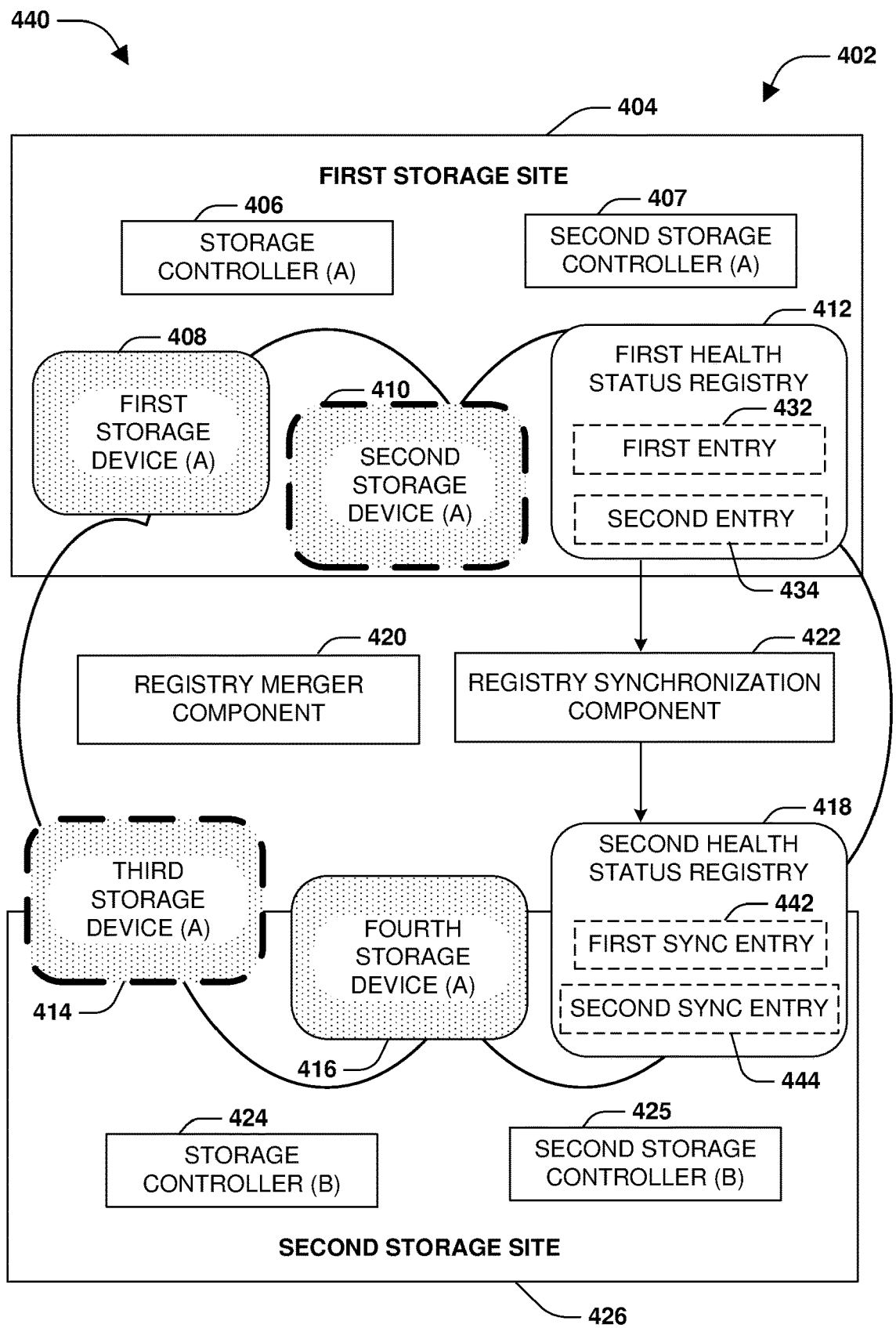
FIG. 4C is an example of a registry synchronization component synchronizing a first health status registry and a second health status registry.

FIG. 4C illustrates an example 440 of the registry synchronization component 422 synchronizing the first health status registry 412 and the second health status registry 418. The registry synchronization component 422 may identify the first entry 432 and the second entry 434 within the first health status registry 412. The registry synchronization component 422 may generate a first registry synchronization update based upon the first entry 432, and may generate a second registry synchronization update based upon the second entry 434. The registry synchronization component 422 may update the second health status registry 418 with a first synchronization entry 442 based upon the first registry synchronization update (e.g., the first synchronization entry 442 may specify that the second storage device (A) 410 has a degraded health state). The registry synchronization component 422 may update the second health status registry 418 with a second synchronization entry 444 based upon the second registry synchronization update (e.g., the second synchronization entry 444 may specify that the third storage device (A) 414 has a degraded health state).

Figure 4D:
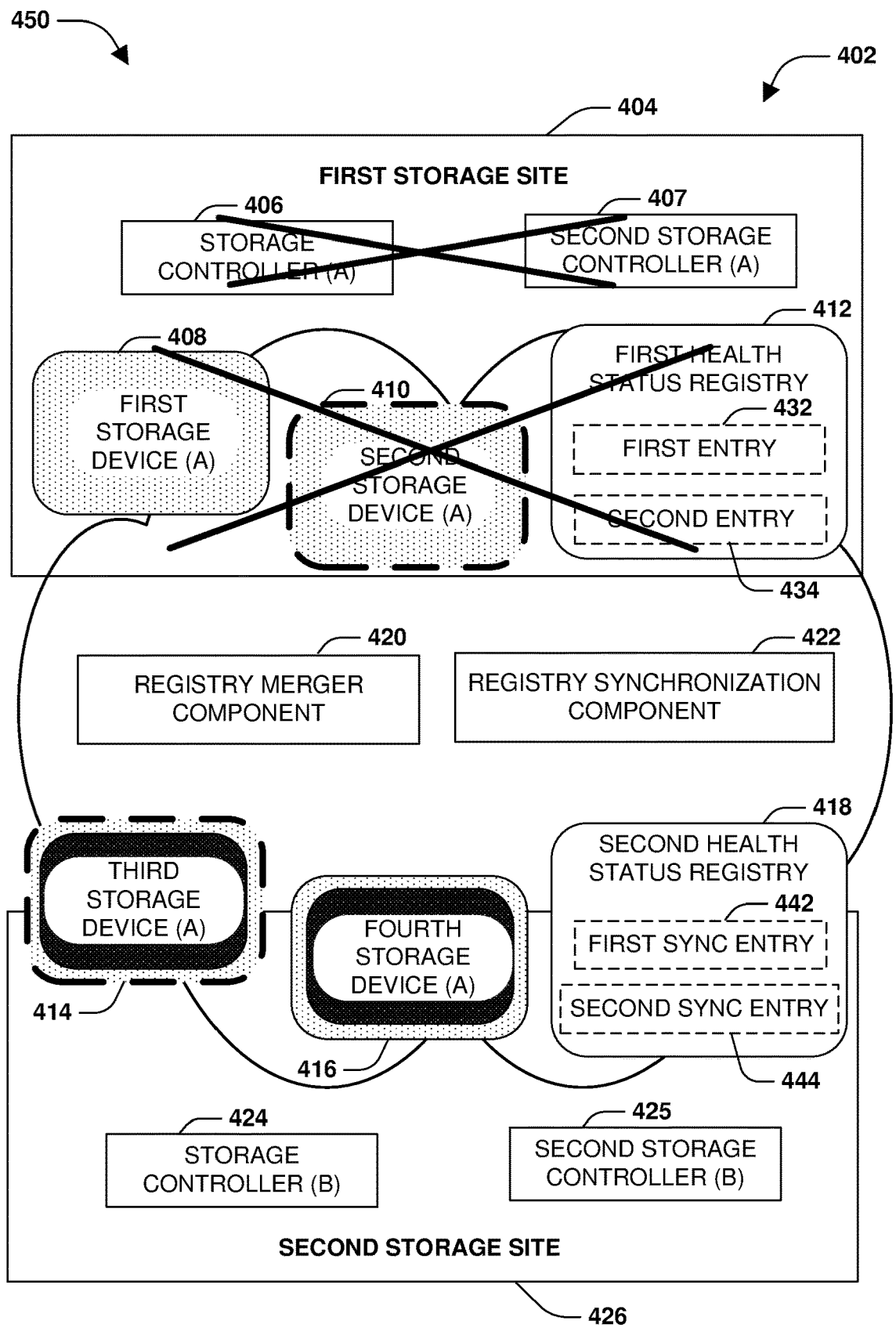
FIG. 4D is an example of a switchover from a storage controller (A) to a storage controller (B).

FIG. 4D illustrates an example 450 of a switchover from the storage controller (A) 406 to the storage controller (B) 424. A disaster of the first storage site 404 is identified. In an example, the disaster affects availability of the storage controller (A) 406 and/or access through the first storage site 404 to the first storage device (A) 408, the second storage device (A) 410, the third storage device (A) 414, and/or the fourth storage device (A) 416. The storage controller (B) 424 may be configured to take ownership of the third storage device (A) 414 and the fourth storage device (A) 416. The storage controller (B) 424 may facilitate data access to the switchover aggregate based upon selective utilization of the third storage device (A) 414 and the fourth storage device (A) 416. For example, the storage controller (B) 424 may provide degraded data access to the third storage device (A) 414 based upon the second synchronization entry 444 specifying that the third storage device (A) 414 has a degraded health status. In an example, the storage controller (B) 424 may provide data access to the fourth storage device (A) 416 based upon the second health status registry 418 indicating that the fourth storage device (A) 416 has a normal operational health status (e.g., based upon a lack of an entry within the second health status registry 418 or based upon an entry indicating that the fourth storage device (A) 416 is healthy).

Figure 4E:
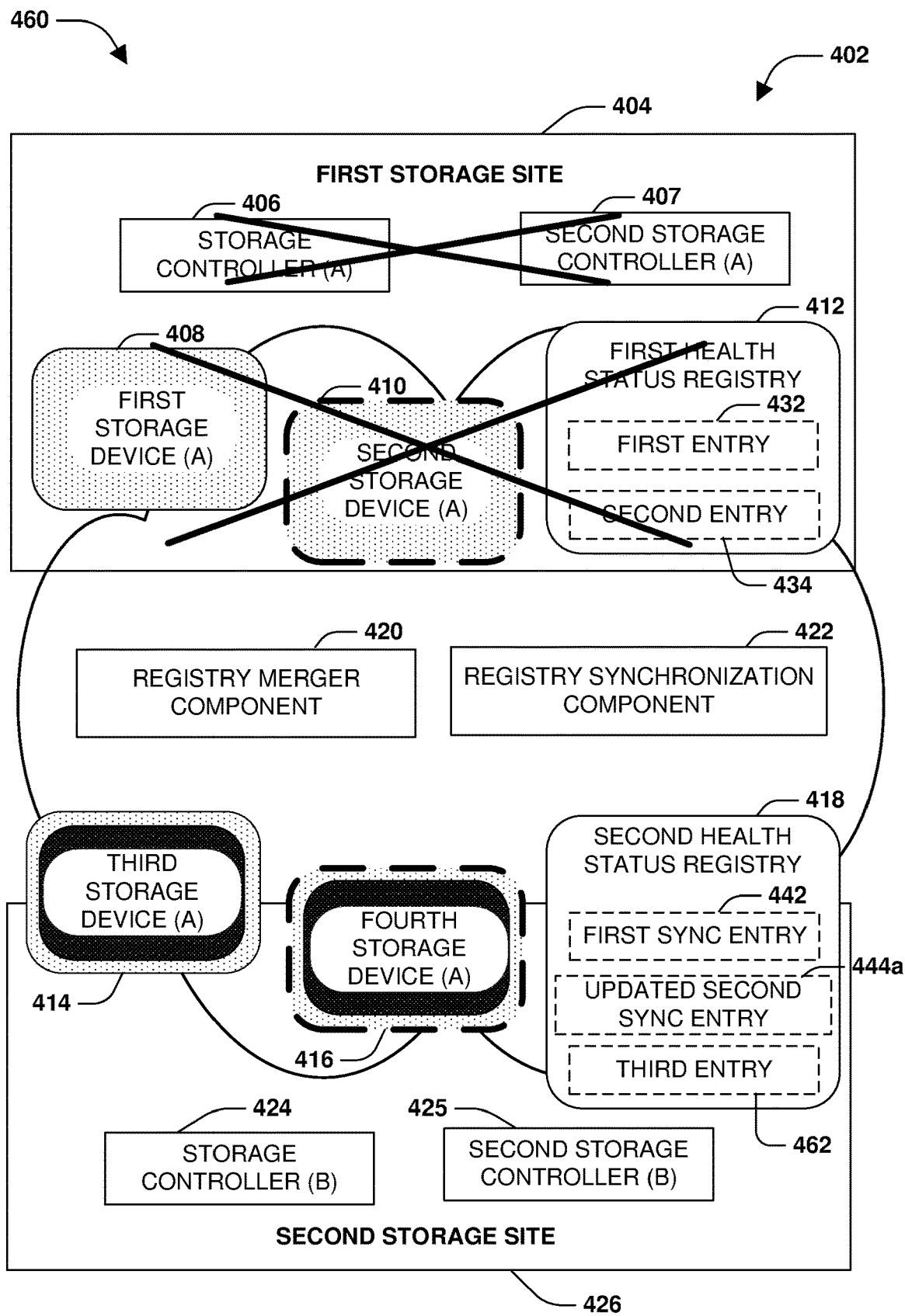
FIG. 4E is an example of a storage controller (B) updating a second health status registry during switchover from a storage controller (A) to the storage controller (B).

FIG. 4E illustrates an example 460 of the storage controller (B) 424 updating the second health status registry 418 during the switchover from the storage controller (A) 406 to the storage controller (B) 424. In an example, the storage controller (B) 424 may identify a third health status change (e.g., a change from a degraded health status to a restored health status) associated with the third storage device (A) 414. The storage controller (B) 424 may update the second synchronization entry 444 within the second health status registry 418 based upon the third health status change, resulting in an updated second synchronized entry 444a (e.g., the second synchronized entry 444 may be deleted or updated from stale health status information, specifying that the third storage device (A) 414 has a degraded health status, to updated health status information specifying that the third storage device (A) 414 has a restored health status). The storage controller (B) 424 may identify a fourth health status change (e.g., a change from a normal operational health status to a degraded health status) associated with the fourth storage device (A) 416. The storage controller (B) 424 may create a third entry 462 within the second health status registry 418 based upon the fourth health status change.

Figure 4F:
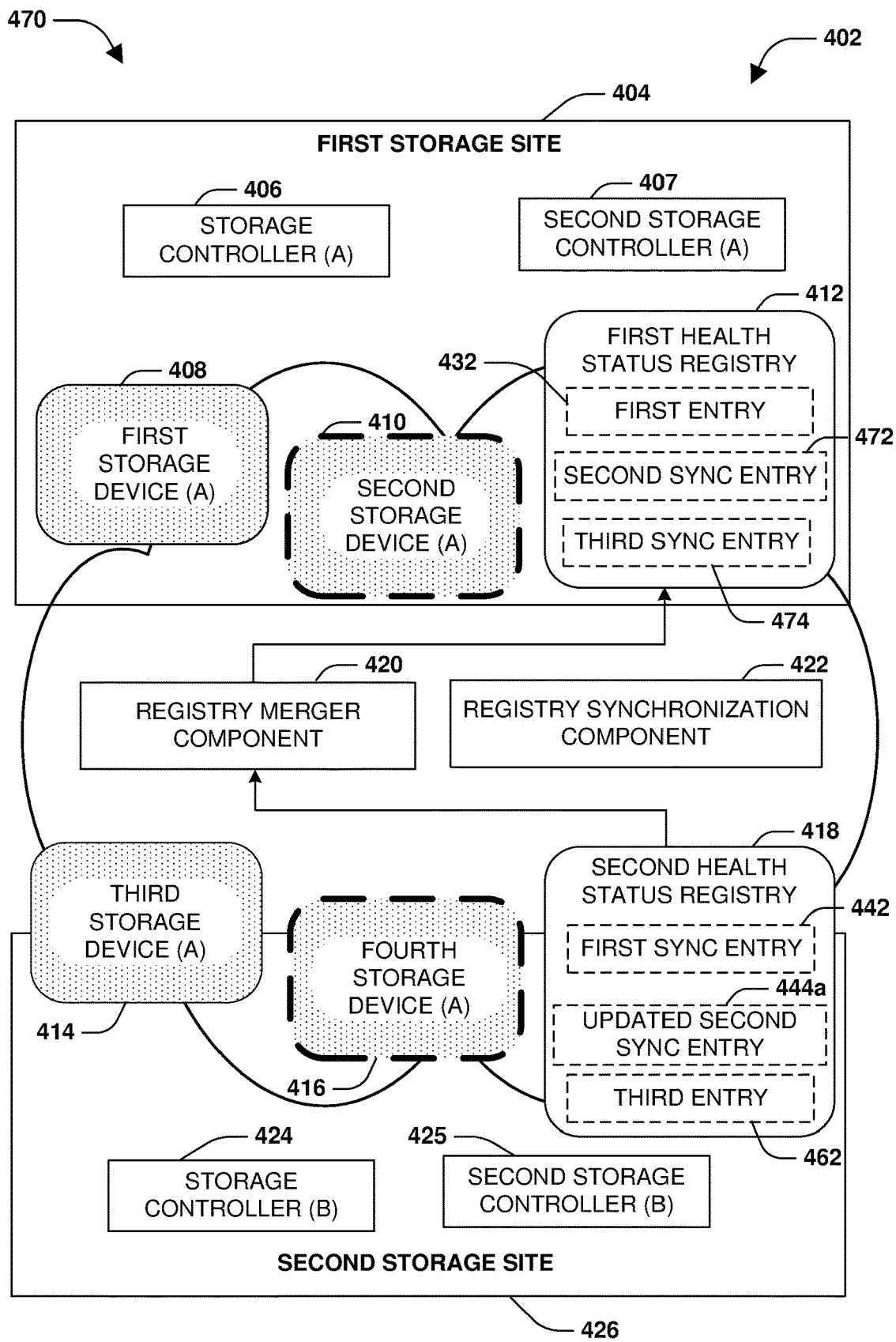
FIG. 4F is an example of a registry merger component merging a first health status registry and a second health status registry.

FIG. 4F illustrates an example 470 of the registry merger component 420 merging the first health status registry 412 and the second health status registry 418. For example, the registry merger component 420 may utilize a real-time storage device evaluation technique to evaluate the third storage device (A) 414 and the fourth storage device (A) 416. Because the updated second synchronization entry 444a corresponds to a current health status of the third storage device (A) 414 identified by the real-time storage device evaluation technique, the registry merger component 420 may replace the second entry 434 (e.g., specifying that the third storage device (A) 414 has a degraded health status) within the first health status registry 412 with a second synchronization entry 472 (e.g., specifying that the third storage device (A) 414 has a restored health status) based upon the updated second synchronization entry 444a. The registry merger component 420 may create a third synchronized entry 474 within the first health status registry 412 based upon the third entry 462 within the second health status registry 418 (e.g., specifying that the fourth storage device (A) 416 has a degraded health status). In this way, the storage controller (A) 406 provides selective data access to the first storage device (A) 408, the second storage device (A) 410, the third storage device (A) 414, and/or the fourth storage device (A) 416 based upon the first health status registry 412 that was merged with up-to-date storage device health status information from the second health status registry 418.

Figure 5:
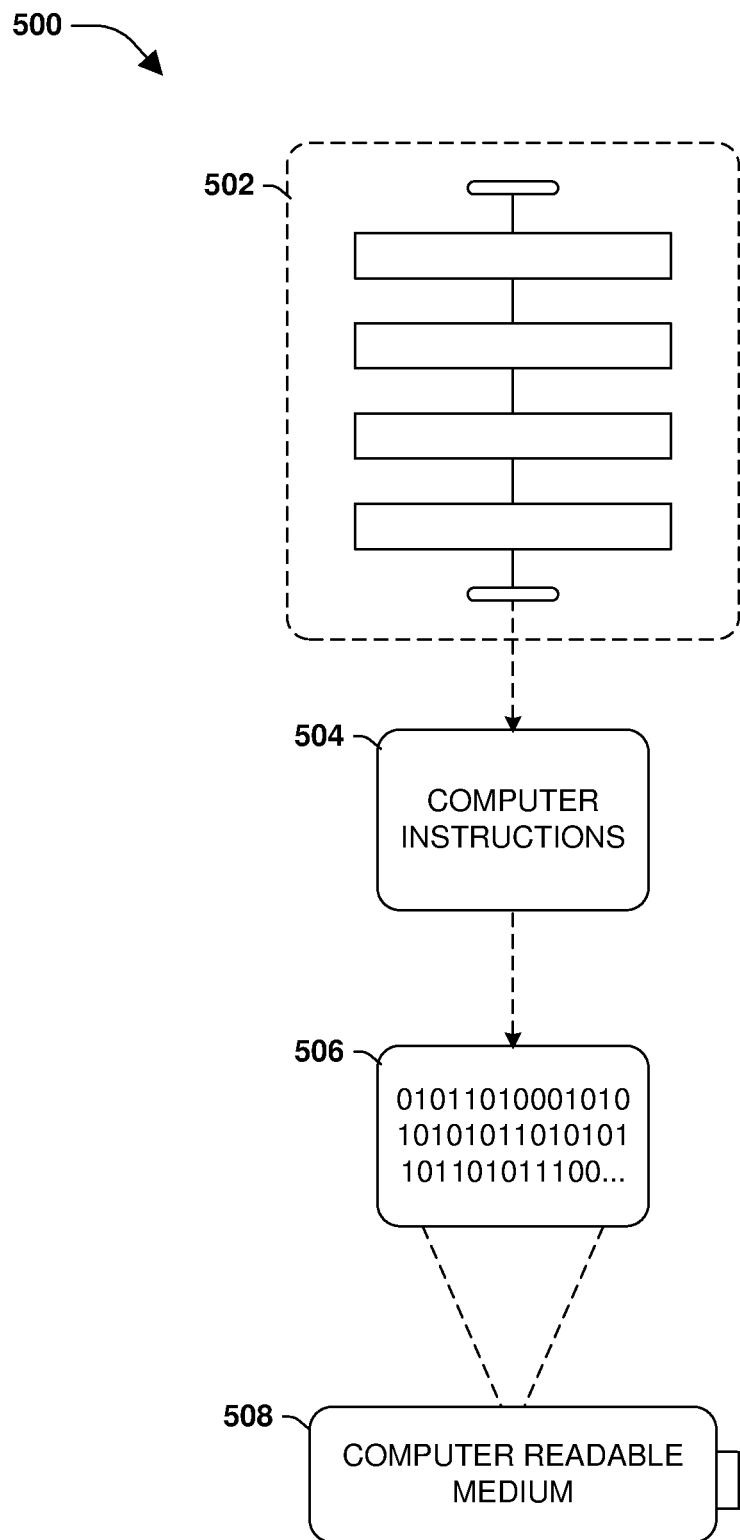
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-ft DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable instructions 504 are configured to implement a system, such as at least some of the exemplary system 402 of FIGS. 4A-4F, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   maintaining a first health status registry, accessible to a first device, comprising a first entry regarding a first health status change of a first storage device maintained by the first device;
   maintaining a second health status registry, accessible to a second device, comprising a second entry regarding a second health status change of a second storage device; and
   synchronizing the first health status registry and the second health status registry by merging entries within the first health status registry and the second health status registry, wherein the synchronizing comprises transmitting a retransmission registry synchronization update to the second device to update the second health status registry.

2. The method of claim 1, wherein the synchronizing comprises:
   transmitting a registry synchronization update to the second health status registry to update the second health status registry.

3. The method of claim 2, comprising:
   transmitting the retransmission registry synchronization update based upon a determination that a communication failure occurred during transmission of the registry synchronization update.

4. The method of claim 3, comprising:
   transmitting the retransmission registry synchronization update based upon establishing communication between the first device and the second device within a retransmission threshold.

5. The method of claim 1, wherein the synchronizing comprises:
   performing a tie-breaker technique to merge the first health status registry and the second health status registry based upon detecting a conflict between information within the first health status registry and the second health status registry.

6. The method of claim 5, comprising:
   detecting the conflict based upon a first merger candidate entry within the first health status registry being different than a second merger candidate entry within the second health status registry.

7. The method of claim 6, comprising:
   utilizing the tie-breaker technique to merge the first merger candidate entry.

8. The method of claim 6, comprising:
   utilizing the tie-breaker technique to merge the second merger candidate entry.

9. The method of claim 6, comprising:
   performing a real-time evaluation of the first storage device as the tie-breaker technique to determine whether the first merger candidate entry matches a health status determined by the real-time evaluation.

10. The method of claim 6, comprising:
    performing a real-time evaluation of the first storage device as the tie-breaker technique to determine whether the second merger candidate entry matches a health status determined by the real-time evaluation.

11. The method of claim 6, comprising:
    performing a real-time evaluation of the first storage device as the tie-breaker technique.

12. A non-transitory computer readable medium having stored thereon machine executable code which when executed by a machine, causes the machine to:
    maintain a first health status registry, accessible to a first device, comprising a first entry regarding a first health status change of a first storage device maintained by the first device;
    maintain a second health status registry, accessible to a second device, comprising a second entry regarding a second health status change of a second storage device; and
    synchronize the first health status registry and the second health status registry by merging entries within the first health status registry and the second health status registry, comprising transmitting a retransmission registry synchronization update to the second device to update the second health status registry.

13. The non-transitory computer readable medium of claim 12, wherein the machine executable code causes the machine to:
    transmit a registry synchronization update to the second health status registry to update the second health status registry.

14. The non-transitory computer readable medium of claim 13, wherein the machine executable code causes the machine to:
    transmit the retransmission registry synchronization update based upon a determination that a communication failure occurred during transmission of the registry synchronization update.

15. The non-transitory computer readable medium of claim 12, wherein the machine executable code causes the machine to:
    perform a tie-breaker technique to merge the first health status registry and the second health status registry based upon detecting a conflict between information within the first health status registry and the second health status registry.

16. A computing device comprising:
a memory containing comprising machine executable code; and
a processor coupled to the memory, the processor configured to execute the machine executable code to cause the processor to:
   maintain a first health status registry, accessible to a first device, comprising a first entry regarding a first health status change of a first storage device maintained by the first device;
   maintain a second health status registry, accessible to a second device, comprising a second entry regarding a second health status change of a second storage device; and
   synchronize the first health status registry and the second health status registry by merging entries within the first health status registry and the second health status registry, comprising transmitting a retransmission registry synchronization update to the second device to update the second health status registry.

17. The computing device of claim 16, wherein the machine executable code causes the processor to:
   transmit a registry synchronization update to the second health status registry to update the second health status registry.

18. The computing device of claim 17, wherein the machine executable code causes the processor to:
   transmit the retransmission registry synchronization update to the second health status registry based upon a determination that a communication failure occurred during transmission of the registry synchronization update.

19. The computing device of claim 18, wherein the machine executable code causes the processor to:
   transmit the retransmission registry synchronization update based upon establishing communication between the first device and the second device within a retransmission threshold.

20. The computing device of claim 16, wherein the machine executable code causes the processor to:
   perform a tie-breaker technique to merge the first health status registry and the second health status registry based upon detecting a conflict between information within the first health status registry and the second health status registry.

* * * * *